（12）United States Patent
San

(10) Patent No.: US 11,301,963 B2
(45) Date of Patent: Apr. 12, 2022

(54) IMAGE PROCESSING METHOD AND IMAGE PROCESSING CIRCUIT

(71) Applicant: REALTEK SEMICONDUCTOR CORPORATION, Hsinchu (TW)

(72) Inventor: Guangyu San, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/008,687

(22) Filed: Sep. 1, 2020

(65) Prior Publication Data
US 2021/0073952 A1 Mar. 11, 2021

(30) Foreign Application Priority Data

Sep. 11, 2019 (CN) .......................... 201910860045.9

(51) Int. Cl.
*G06T 5/00* (2006.01)
*G06T 5/20* (2006.01)
(Continued)

(52) U.S. Cl.
CPC ................ *G06T 5/002* (2013.01); *G06T 5/20* (2013.01); *G06T 5/50* (2013.01); *G06T 7/254* (2017.01);
(Continued)

(58) Field of Classification Search
CPC ........... G06T 5/002; G06T 7/254; G06T 5/20; G06T 5/50; G06T 7/215; H04N 19/56; H04N 19/76; H04N 19/513; H04N 19/57
See application file for complete search history.

(56) References Cited

U.S. PATENT DOCUMENTS 6,320,906 B1 * 11/2001 Toyokura ............... H04N 5/145
348/409.1
8,254,677 B2 * 8/2012 Abe ....................... H04N 19/14
348/700

(Continued)

FOREIGN PATENT DOCUMENTS

CN 101714209 A 5/2010
TW 200622704 A 7/2006
TW 201334520 A1 8/2013

OTHER PUBLICATIONS

OA letter of the counterpart TW application (appl. No. 108136693) mailed on Nov. 9, 2020. Summary of the OA letter: (1) Claims 1,4, 7 and 10 are rejected under Patent Law Article 22(2) as being unpatentable over reference 1 (TW 201334520 A) and reference 2 (CN 101714209 A). (2) Claims 2, 5 and 8 are rejected under Patent Law Article 22(2) as being unpatentable over reference 1 (TW 201334520 A), reference 2 (CN 101714209 A) and reference 3 (TW 200622704 A).

*Primary Examiner* — Mekonen T Bekele
(74) *Attorney, Agent, or Firm* — WPAT, PC

(57) ABSTRACT

An image processing method and an image processing circuit are provided. The method and circuit are applied to motion estimation. The method includes the steps of: performing low-pass filtering on a first image and a second image, wherein the first image is part of a first frame, the second image is part of a second frame, and the first frame is different from the second frame; calculating a first characteristic value of the first image and calculating a second characteristic value of the second image; calculating a sum of absolute difference (SAD) between the first image and the second image; blending the difference between the first characteristic value and the second characteristic value and the SAD to generate a blended result; and estimating a (Continued)

motion vector between the first image and the second image according to the blended result.

9 Claims, 6 Drawing Sheets

(51) Int. Cl.
*G06T 7/254* (2017.01)
*G06T 5/50* (2006.01)
(52) U.S. Cl.
CPC ............ *G06T 2207/20024* (2013.01); *G06T 2207/20224* (2013.01)

(56) References Cited

U.S. PATENT DOCUMENTS

| | | | |
|---|---|---|---|
| 8,582,806 B2 | 11/2013 | Yokono et al. | |
| 10,262,422 B2* | 4/2019 | Sfaradi | H04N 5/145 |
| 2002/0067464 A1* | 6/2002 | Werner | G03B 21/32 |
| | | | 352/40 |
| 2006/0291563 A1* | 12/2006 | Park | H04N 19/61 |
| | | | 375/240.17 |
| 2008/0170617 A1* | 7/2008 | Han | H04N 19/14 |
| | | | 375/E7.092 |
| 2009/0034859 A1* | 2/2009 | Park | H04N 19/48 |
| | | | 382/250 |
| 2010/0027661 A1* | 2/2010 | Doida | H04N 5/144 |
| | | | 375/240.16 |
| 2010/0086175 A1* | 4/2010 | Yokono | G06K 9/4619 |
| | | | 382/103 |
| 2011/0019093 A1* | 1/2011 | Zhong | G06T 5/002 |
| | | | 348/607 |
| 2011/0293195 A1* | 12/2011 | Nakagami | H04N 19/573 |
| | | | 382/233 |
| 2018/0018776 A1* | 1/2018 | Sfaradi | G06T 7/246 |
| 2018/0131960 A1* | 5/2018 | Wang | H04N 19/139 |
| 2020/0372260 A1* | 11/2020 | Tagami | G06T 7/254 |

* cited by examiner

IMAGE PROCESSING METHOD AND IMAGE PROCESSING CIRCUIT

BACKGROUND OF THE INVENTION

1. Field of the Invention

The present invention generally relates to image processing, and, more particularly, to motion estimation and motion compensation (MEMC).

2. Description of Related Art

In the technical field of image processing, the motion estimation and motion compensation (hereinafter referred to as MEMC) technology is often employed in frame rate conversion. For example, the MEMC technology is utilized to perform motion interpolation for converting a video from a low frame rate to a high frame rate. The motion vector between two frames or images is usually estimated based on the sum of absolute differences (SAD) between pixels. However, the SAD-based estimation method renders the motion vector subject to the brightness changes in the frames or images. An inaccurate motion vector may cause the side effect of shimmer in the frame or image after interpolation. The occurrence of the shimmer side effect means that the interpolated frame or image and its adjacent frames or images are not continuous, and this side effect usually occurs in areas with dense and irregular textures. Therefore, a better image processing technology is needed to address this problem.

SUMMARY OF THE INVENTION

In view of the issues of the prior art, an object of the present invention is to provide an image processing method and an image processing circuit that improve the accuracy of motion vector estimation, so as to make an improvement to the prior art.

A circuit is provided. The circuit includes a memory and a processor. The memory is configured to store multiple pixel data of at least one part of a first frame and multiple pixel data of at least one part of a second frame, the first frame being different from the second frame. The processor is coupled to the memory and configured to perform following steps: performing low-pass filtering on a first image and a second image, the first image being a part of the first frame and the second image being a part of the second frame; calculating a first characteristic value of the first image and a second characteristic value of the second image; calculating a sum of absolute differences (SAD) between the first image and the second image; calculating a difference between the first characteristic value and the second characteristic value; blending the difference and the SAD to generate a blended result; and estimating a motion vector between the first image and the second image according to the blended result.

A method is provided. The method includes the following steps: low-pass filtering a first image and a second image, the first image being a part of a first frame, the second image being a part of a second frame, and the first frame being different from the second frame; calculating a first characteristic value of the first image and a second characteristic value of the second image; calculating a sum of absolute differences (SAD) between the first image and the second image; calculating a difference between the first characteristic value and the second characteristic value; blending the difference and the SAD to generate a blended result; and estimating a motion vector between the first image and the second image according to the blended result.

An image processing circuit is also provided. The image processing circuit is applied to motion estimation and includes a memory and a processor. The memory is configured to store multiple pixel data of at least one part of a first frame and multiple pixel data of at least one part of a second frame, and to store multiple program instructions or program codes. The first frame is different from the second frame. The processor is coupled to the memory and configured to execute the program instructions or program codes to perform following steps: performing low-pass filtering on a first image and a second image, the first image being a part of the first frame and the second image being a part of the second frame; calculating a first characteristic value of the first image and a second characteristic value of the second image; and estimating a motion vector between the first image and the second image according to the first characteristic value and the second characteristic value.

The image processing method and image processing circuit of the present invention can generate accurate motion vectors by reducing the interference of brightness changes. Compared with the conventional technology, the present invention can suppress or reduce the shimmer side effect and therefore make the interpolated frames or images more natural and continuous in time.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes image processing methods and image processing circuits. On account of that some or all elements of the image processing circuit could be known, the detail of such elements is omitted provided that such detail has little to do with the features of this disclosure, and that this omission nowhere dissatisfies the specification and enablement requirements. Some or all of the processes of the image processing methods may be implemented by software and/or firmware and can be performed by the image processing circuit or its equivalent. A person having ordinary skill in the art can choose components or steps equivalent to those described in this specification to carry out the present invention, which means that the scope of this invention is not limited to the embodiments in the specification.

As used herein, the term "and/or" includes any and all combinations of one or more of the associated listed items. Although the terms "first," "second," etc., may be used herein to describe various elements, these elements should not be limited by these terms. These terms used in this way aim to distinguish one element from another. For example, a first element could be termed a second element, and, similarly, a second element could be termed a first element, without departing from the scope of the embodiments.

Figure 1:
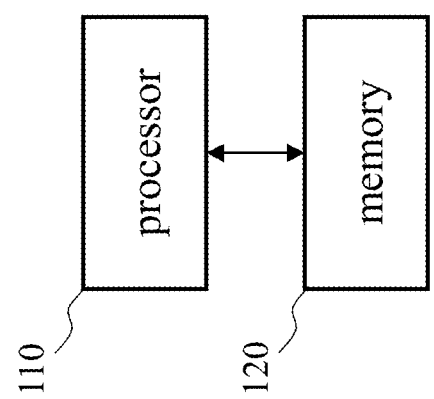
FIG. 1 illustrates a functional block diagram of an image processing circuit according to an embodiment of the present invention.

FIG. 1 is a functional block diagram of an image processing circuit according to an embodiment of the present invention. The image processing circuit 100 includes a processor 110 and a memory 120. The processor 110 may be a circuit or electronic component with program execution capability, such as a central processing unit, a microprocessor, or a micro-processing unit. The processor 110 performs image processing by executing the program instructions or program codes. The program instructions or program codes may be stored for example in the memory 120.

In addition to the program instructions or program codes, the memory 120 further stores pixel data of at least a part of the first frame and pixel data of at least a part of the second frame. The first frame is different from the second frame. For example, the memory 120 can be used as a line buffer which stores the pixel values (including the brightness information and/or chrominance information) of at least one row of pixels in the first frame and the pixel values of at least one row of pixels in the second frame.

Figure 2:
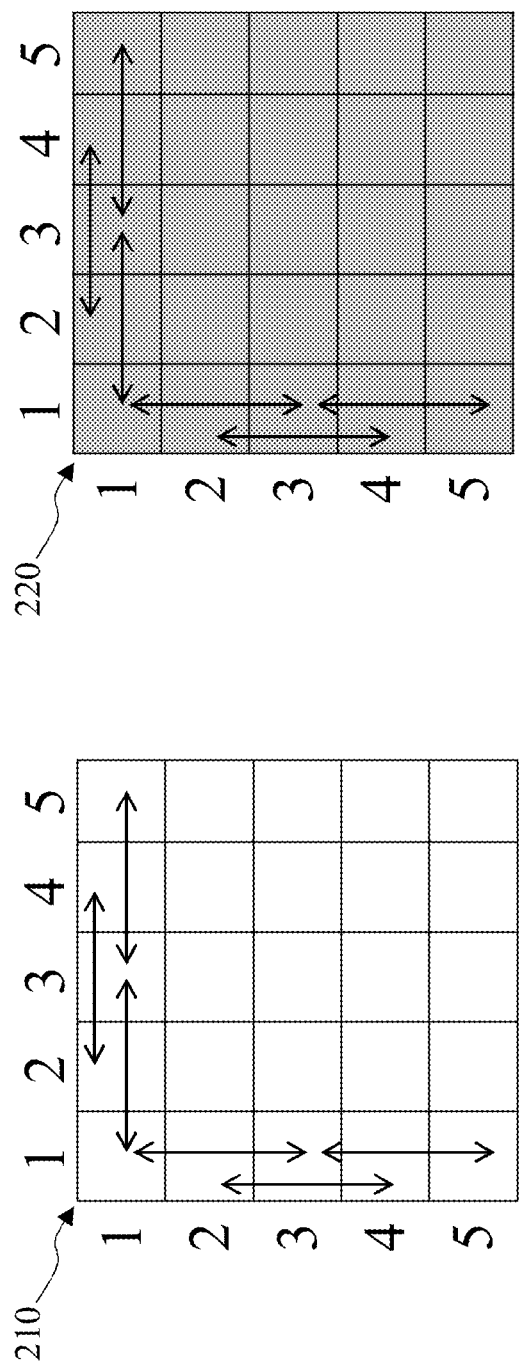
FIGS. 2A to 2B illustrate schematic diagrams of the image or operation window.

FIGS. 2A and 2B show the image 210 and the image 220, respectively. The image 210 is a part of the first frame, and the image 220 is a part of the second frame. The image 210 and the image 220 may correspond to the operation window of the image processing method of the present invention, that is, the operation window of the present invention may be a square as illustrated in FIGS. 2A and 2B (5 pixels on each side as in this example embodiment). The number of pixels in the operation window or image is intended to illustrate the invention by way of examples, rather than to limit the scope of the claimed invention.

Figure 3:
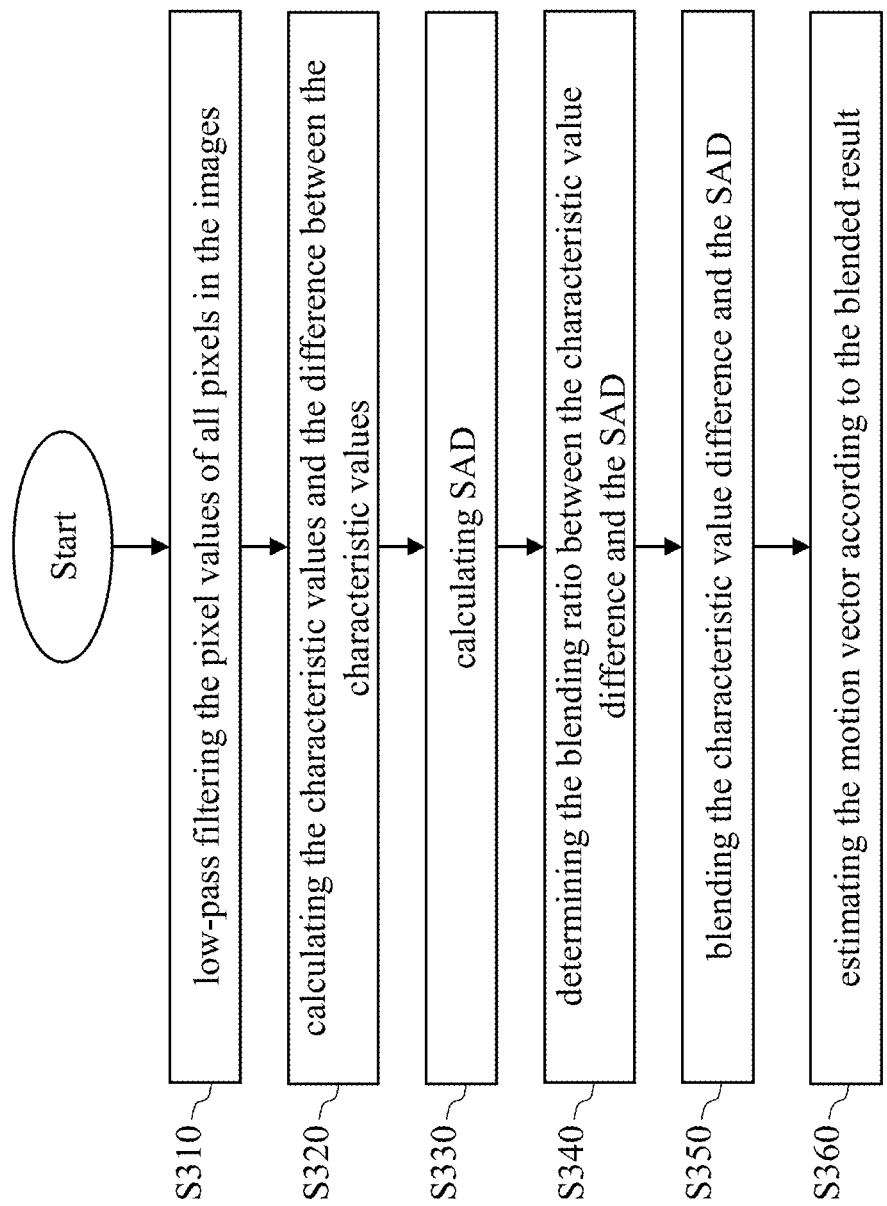
FIG. 3 illustrates a flowchart of the image processing method according to an embodiment of the present invention.

FIG. 3 is a flowchart of the image processing method according to an embodiment of the present invention. In the following description, the pixel value may refer to the brightness or chrominance of a given pixel, or a combination of both. First, the processor 110 performs low-pass filtering on the images 210 and 220, that is, to low-pass filter the pixel values of all pixels in the images 210 and 220 (step S310). Low-pass filtering an image can eliminate the distortion interference from the weak edges in the image, and the weak edges refer to edges that are not very prominent when viewed with the naked eyes. The low-pass filtering operation is well known to people having ordinary skill in the art, and the details are thus omitted for brevity.

Next, the processor 110 calculates the characteristic values of the image 210 and image 220, respectively (step S320). The present invention provides two methods of calculating the characteristic value, which are discussed in detail below.

Figure 4:
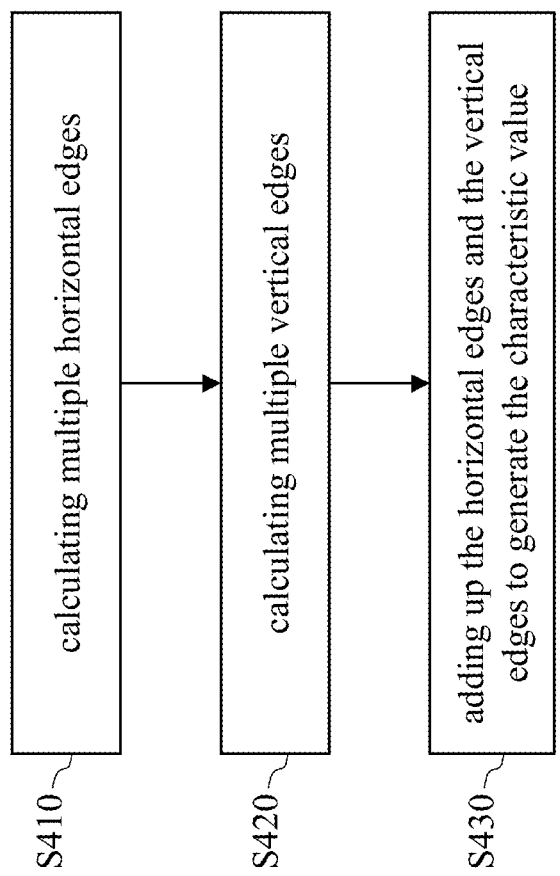
FIG. 4 illustrates a flowchart of the characteristic value calculating method according to an embodiment of the present invention.

FIG. 4 shows a flowchart of the characteristic value calculating method (Method 1) according to an embodiment of the present invention. The processor 110 calculates multiple horizontal edges in the image (step S410), then calculates multiple vertical edges in the image (step S420), and finally adds up the horizontal edges and the vertical edges to generate a sum edge of the image, which is the characteristic value of the image (step S430).

In step S410, the processor 110 calculates the absolute difference between any two pixels in a given row separated apart by N (N is a positive integer) pixels, and performs the same calculation on each row. More specifically, as indicated by the horizontal arrows in FIGS. 2A and 2B (N=1 in this example), the horizontal edges of the first row include |P(1, 1)−P(1, 3)|, |P(1, 2)−P(1, 4)| and |P(1, 3)−P(1, 5)|, where P(i, j) stands for the pixel value of the pixel of row i and column j. Similarly, the horizontal edges of the second row include |P(2, 1)−P(2, 3)|, |P(2, 2)−P(2, 4)| and |P(2, 3)−P(2, 5)|. Similar comments can be made about the third row to the fifth row. Therefore, the sum of the horizontal edges of the image 210 or image 220 can be expressed as:

$$SE_h = \Sigma_{i=1}^{5} |P(i,1)-P(i,3)| + |P(i,2)-P(i,4)| + |P(i,3)-P(i,5)| \quad (1)$$

In step S420, the processor 110 calculates the absolute difference between any two pixels in a given column separated apart by N pixels, and performs the same calculation on each column. More specifically, as indicated by the vertical arrows in FIGS. 2A and 2B (N=1 in this example), the vertical edges of the first column include |P(1, 1)−P(3, 1)|, |P(2, 1)−P(4, 1)| and |P(3, 1)−P(5, 1)|. Similarly, the vertical edges of the second column include |P(1, 2)−P(3, 2)|, |P(2, 2)−P(4, 2)| and |P(3, 2)−P(5, 2)|. Similar comments can be made about the third column to the fifth column. Therefore, the sum of the vertical edges of the image 210 or image 220 can be expressed as:

$$SE_v = \Sigma_{j=1}^{5} |P(1,j)-P(3,j)| + |P(2,j)-P(4,j)| + |P(3,j)-P(5,j)| \quad (2)$$

In step S430, the processor 110 calculates the characteristic value CV of the image 210 or image 220 according to the following equation. The characteristic value CV is the sum of all horizontal edges and all vertical edges in the image.

$$CV = SE_h + SE_v \quad (3)$$

Figure 5:
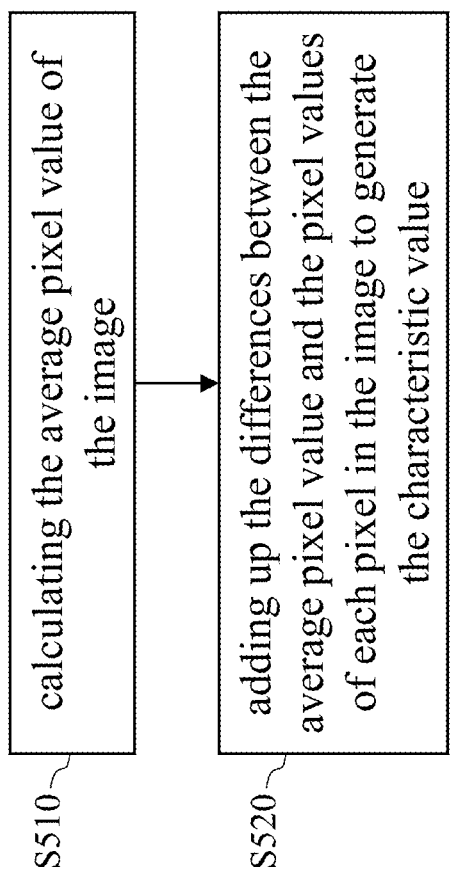
FIG. 5 illustrates a flowchart of the characteristic value calculating method according to another embodiment of the present invention.

FIG. 5 shows a flowchart of the characteristic value calculating method (Method 2) according to another embodiment of the present invention. The processor 110 calculates the average pixel value of the image (step S510), and then adds up the differences between the average pixel value and the pixel values of each pixel in the image to generate the characteristic value (step S520).

In step S510, the processor 110 may calculate the average pixel value of the image according to the following equation.

$$P_{av} = \Sigma_{i=1}^{5} \Sigma_{j=1}^{5} P(i,j)/25 \quad (4)$$

In step S520, the processor 110 may calculate the characteristic value CV according to the following equation.

$$CV = \Sigma_{i=1}^{5} \Sigma_{j=1}^{5} (P(i,j) - P_{av}) \quad (5)$$

When there is no texture or few textures in the original or low-pass filtered image (i.e., the image is a substantially flat area), the characteristic value CV calculated using either Method 1 or Method 2 is equal to 0 or approximately 0.

Reference is made to FIG. 3. In step S320, the processor 110 calculates the characteristic value ($CV_1$) of the image 210 and the characteristic value ($CV_2$) of the image 220 respectively, and then calculates the characteristic value difference $CV_D=|CV_1-CV_2|$ of the two images.

The processor 110 then calculates the SAD between the image 210 and image 220 in step S330:

$$SAD=\Sigma_{i=1}^{5}\Sigma_{j=1}^{5}|P_1(i,j)-P_2(i,j)| \quad (6)$$

$P_1(i, j)$ in equation (6) stands for the pixel value of a pixel in the image 210, and $P_2(i, j)$ stands for the pixel value of a pixel in the image 220.

Next, the processor 110 determines the blending ratio between the characteristic value difference $CV_D$ and the SAD (step S340). The processor 110 may determine the blending ratio ($0 \leq \alpha \leq 1$) based on the following factors or features: the degree of change in the pixel values of the image (e.g., the degree of change in brightness), the SAD between the two images, and the edge conditions. For example, the processor 110 can blend the characteristic value difference $CV_D$ and the SAD according to equation (7) below with the blending ratio $\alpha$ being inversely proportional to the SAD, or perform the blending according to equation (7) only when the characteristic value CV is relatively small.

Next, the processor 110 blends the characteristic value difference $CV_D$ and the SAD (step S350). The processor 110 may perform blending according to the following equation to generate a blended result BL:

$$BL=\alpha \times SAD+(1-\alpha) \times CV_D \quad (7)$$

Next, the processor 110 estimates the motion vector or determines the reliability of the motion vector according to the blended result BL (step S360). For example, the smaller the blended result BL, the smaller the difference between the image 210 and image 220, hence, the higher the reliability of the motion vector between the two.

In the conventional technology, even if both the image 210 and image 220 are flat areas, the pixel value bias (e.g., brightness difference, as illustrated with the white background and the gray background in FIGS. 2A and 2B) may probably lead to a false conclusion that the two images are not similar to each other due to the SAD between the two being too large, resulting in the motion vector between the two images being discarded or given a lower weight. In contrast, in this case, since the pixel value bias can be eliminated in step S320, a more accurate motion vector can be obtained by taking the characteristic value CV into consideration. In other words, the motion vector determined in the image processing method and the image processing circuit of the present invention is less susceptible to the change in the brightness of the images, which effectively suppresses the occurrence of shimmer.

Figure 6:
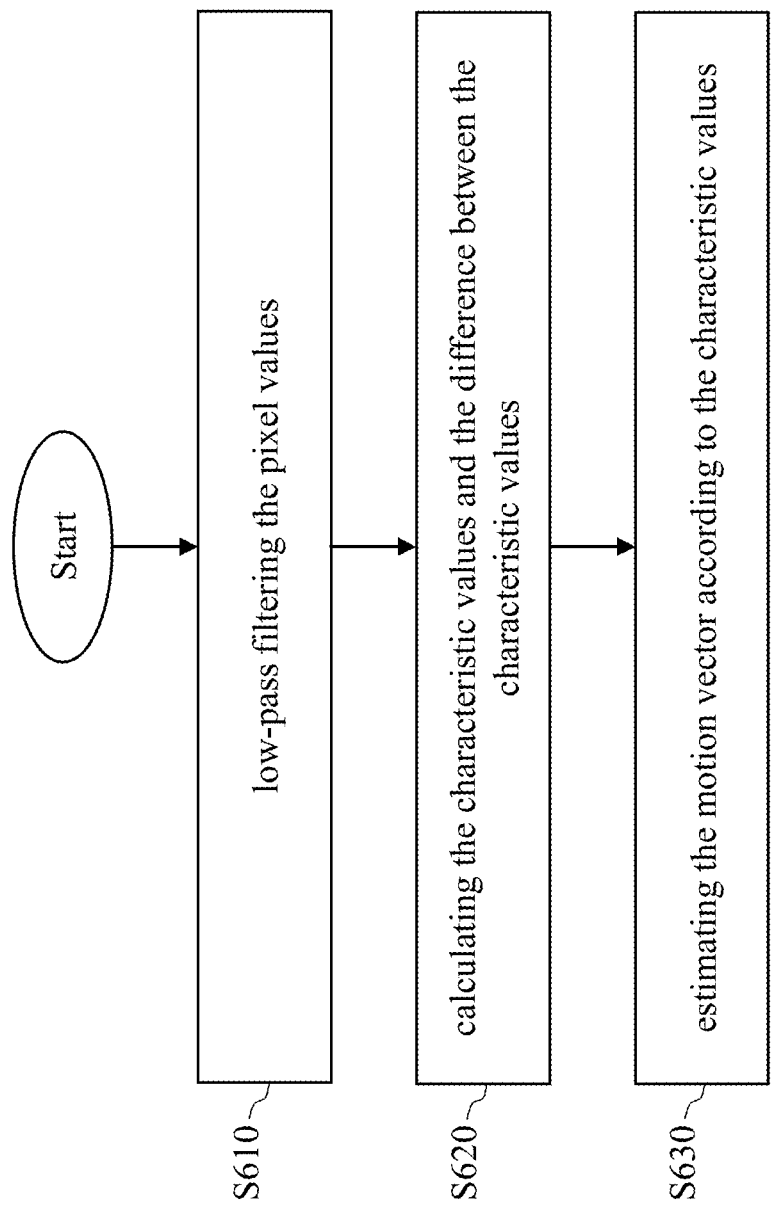
FIG. 6 illustrates a flowchart of the image processing method according to another embodiment of the present invention.

FIG. 6 is a flowchart of the image processing method according to another embodiment of the present invention. In this embodiment, the characteristic value CV is taken into consideration, while the SAD is not, when the image processing method and the image processing circuit estimate the motion vector. The details are discussed below. First, the processor 110 performs low-pass filtering on the images 210 and 220, that is, to low-pass filter the pixel values of all pixels in the images 210 and 220 (step S610). Step S610 is the same as step S310, and the details are thus omitted for brevity. Next, the processor 110 calculates the characteristic values CV of the image 210 and image 220, respectively (step S620). Step S620 is the same as step S320. In other words, step S620 also includes the above two methods, which are illustrated in the flowcharts of FIG. 4 and FIG. 5, respectively, and the details are thus omitted for brevity. Next, the processor 110 estimates the motion vector according to the characteristic value $CV_1$ of the image 210 and the characteristic value $CV_2$ of the image 220 (e.g., by taking the two characteristic values $CV_1$ and $CV_2$ into consideration) (step S630). More specifically, the processor 110 may estimate the motion vector according to the difference value $CV_D$ ($=|CV_1-CV_2|$) between the characteristic value $CV_1$ and the characteristic value $CV_2$. For example, when finding the characteristic value difference $CV_D$ smaller (i.e., $CV_1$ and $CV_2$ being closer to each other), which implies a smaller difference between the image 210 and image 220 (i.e., a higher similarity between the image 210 and image 220), the processor 110 gives a higher reliability to the motion vector between the two images.

The embodiment of FIG. 6 can be regarded as a special case of the embodiment of FIG. 3. More specifically, the embodiment of FIG. 6 sets the blending ratio in equation (7) to 0 and skips steps S330, S340 and S350 of FIG. 3. In some cases where the SAD is not trustworthy (i.e., not reliable or having low reliability, such as when the brightness change in the image is too large), the method of FIG. 6 is employed to completely rule out SAD (i.e., not taking SAD into consideration) to reduce the amount of calculation. As a result, the performance of the image processing circuit is improved, and power consumption is reduced.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A circuit, comprising:
    a memory configured to store a plurality of pixel data of at least one part of a first frame and a plurality of pixel data of at least one part of a second frame, the first frame being different from the second frame; and
    a processor coupled to the memory and configured to perform following steps:
        performing low-pass filtering on a first image and a second image, the first image being a part of the first frame and the second image being a part of the second frame;
        calculating a first characteristic value of the first image and a second characteristic value of the second image;
        calculating a sum of absolute differences (SAD) between the first image and the second image;
        calculating a difference between the first characteristic value and the second characteristic value;
        blending the difference and the SAD to generate a blended result; and estimating a motion vector between the first image and the second image according to the blended result.

2. The circuit of claim 1, wherein the processor further performs following steps to calculate the first characteristic value and the second characteristic value:
- calculating a plurality of first horizontal edges of the first image;
- calculating a plurality of first vertical edges of the first image;
- adding up the first horizontal edges and the first vertical edges to generate the first characteristic value;
- calculating a plurality of second horizontal edges of the second image;
- calculating a plurality of second vertical edges of the second image; and
- adding up the second horizontal edges and the second vertical edges to generate the second characteristic value.

3. The circuit of claim 1, wherein the processor further performs following steps to calculate the first characteristic value and the second characteristic value:
- calculating a first average pixel value of the first image;
- adding up differences between the first average pixel value and pixel values of each pixel in the first frame to generate the first characteristic value;
- calculating a second average pixel value of the second image; and
- adding up differences between the second average pixel value and pixel values of each pixel in the second frame to generate the second characteristic value.

4. A method comprising:
- low-pass filtering a first image and a second image, the first image being a part of a first frame, the second image being a part of a second frame, and the first frame being different from the second frame;
- calculating a first characteristic value of the first image and a second characteristic value of the second image;
- calculating a sum of absolute differences (SAD) between the first image and the second image;
- calculating a difference between the first characteristic value and the second characteristic value;
- blending the difference and the SAD to generate a blended result; and
- estimating a motion vector between the first image and the second image according to the blended result.

5. The method of claim 4, wherein the step of calculating the first characteristic value of the first image and the second characteristic value of the second image comprises:
- calculating a plurality of first horizontal edges of the first image;
- calculating a plurality of first vertical edges of the first image;
- adding up the first horizontal edges and the first vertical edges to generate the first characteristic value;
- calculating a plurality of second horizontal edges of the second image;
- calculating a plurality of second vertical edges of the second image; and
- adding up the second horizontal edges and the second vertical edges to generate the second characteristic value.

6. The method of claim 4, wherein the step of calculating the first characteristic value of the first image and the second characteristic value of the second image comprises:
- calculating a first average pixel value of the first image;
- adding up differences between the first average pixel value and pixel values of each pixel in the first frame to generate the first characteristic value;
- calculating a second average pixel value of the second image; and
- adding up differences between the second average pixel value and pixel values of each pixel in the second frame to generate the second characteristic value.

7. An image processing circuit applied to motion estimation, comprising:
- a memory configured to store a plurality of pixel data of at least one part of a first frame and a plurality of pixel data of at least one part of a second frame, and to store a plurality of program instructions or program codes, wherein the first frame is different from the second frame; and
- a processor, coupled to the memory and configured to execute the program instructions or program codes to perform following steps:
  - performing low-pass filtering on a first image and a second image, wherein the first image is a part of the first frame and the second image is a part of the second frame;
  - calculating a first characteristic value of the first image and a second characteristic value of the second image; and
  - estimating a motion vector between the first image and the second image according to the first characteristic value and the second characteristic value.

8. The image processing circuit of claim 7, wherein the processor further performs following steps to calculate the first characteristic value and the second characteristic value:
- calculating a plurality of first horizontal edges of the first image;
- calculating a plurality of first vertical edges of the first image;
- adding up the first horizontal edges and the first vertical edges to generate the first characteristic value;
- calculating a plurality of second horizontal edges of the second image;
- calculating a plurality of second vertical edges of the second image; and
- adding up the second horizontal edges and the second vertical edges to generate the second characteristic value.

9. The image processing circuit of claim 7, wherein the processor further performs following steps to calculate the first characteristic value and the second characteristic value:
- calculating a first average pixel value of the first image;
- adding up differences between the first average pixel value and pixel values of each pixel in the first frame to generate the first characteristic value;
- calculating a second average pixel value of the second image; and
- adding up differences between the second average pixel value and pixel values of each pixel in the second frame to generate the second characteristic value.

* * * * *